United States Patent [19]
Jansa

[11] 3,834,057
[45] Sept. 10, 1974

[54] FISHING ROD HOLDER

[76] Inventor: Edward F. Jansa, 2402 S. 5th St., Omaha, Nebr. 68108

[22] Filed: Mar. 13, 1973

[21] Appl. No.: 340,897

[52] U.S. Cl. .................................. 43/21.2, 248/40
[51] Int. Cl. ............................................. A01k 97/10
[58] Field of Search ............ 43/21.2; 248/38, 40, 42

[56] References Cited
UNITED STATES PATENTS

| | | | |
|---|---|---|---|
| 2,609,162 | 9/1952 | Howsam | 151/68 X |
| 2,899,769 | 8/1959 | Niles | 43/21.2 |
| 3,161,390 | 12/1964 | Larson | 248/40 |
| 3,633,304 | 1/1972 | Brazell | 43/17 |

Primary Examiner—Robert Peshock
Assistant Examiner—Daniel J. Leach
Attorney, Agent, or Firm—Clarence A. O'Brien; Harvey B. Jacobson

[57] ABSTRACT

A fishing rod holder having a standard and an insert mountable on a fishing rod for selectively engaging the standard. The insert is preferably in the shape of a hyperboloid of one sheet having parallel bases of different areas, and is secured on a reel mounting portion of the handle of a fishing rod by a bolt passing through an opening provided in the handle portion and engaging a threaded hole in the insert. A socket is provided on the standard for matingly receiving the insert, the base of smallest area first; the insert and socket may be advantageously provided with longitudinally extending splines and grooves, respectively, for preventing sway while permitting a rod to be rigidly held extending in any desired direction.

13 Claims, 7 Drawing Figures

PATENTED SEP 10 1974 3,834,057

FISHING ROD HOLDER

BACKGROUND OF THE INVENTION

1. Field of the Invention

This invention relates generally to a holder, and particularly to a fishing rod holder.

2. Description of the Prior Art

Holders are known which support a fishing rod so that the rod may be easily and quickly removed from the holder by a fisherman when a fish bites. U.S. Pat. No. 2,899,769, for example, shows a rod and reel holder in which a mandrel-like head selectively engages the mounting member of a spike. This head is mounted on the fishing rod by means of a threaded stud extending from the head, and which replaces a bolt that would normally clamp a reel to the rod handle. Thus, this threaded stud secures a reel as well as the mandrel-like head to the handle.

A disadvantage of the kind of arrangement shown in U.S. Pat. No. 2,899,769, however, is that the holder is limited to certain models of rods, being incompatable with certain kinds of reel holders. Further, the shape of the head is such that the head will too easily slip out of the socket formed by the mounting member, and will spin freely with resulting tangle of lines.

U.S. Pat. No. 2,459,549 discloses a fishing rod holder in which a pin mounted on the rod in a manner similar to the head of U.S. Pat. No. 2,899,769 is received in opposed slots formed in an associated standard. Thus, spinning of the rod about the standard is prohibited. This arrangement, however, permits the rod to sway, and restricts it to a single position with respect to the standard. In order to move the rod so as to extend in another direction, the standard must be repositioned. This is a nuisance to the fisherman, and increases the risk of losing an expensive rod and reel in the process.

SUMMARY OF THE INVENTION

It is an object of the present invention to provide a practical and dependable fishing rod holder that may be used confidently by a fisherman.

It is another object of the present invention to provide a fishing rod holder that permits quick and easy removal of the rod from the holder as desired, but provides a sure support for the rod at other times.

It is yet another object of the present invention to provide a fishing rod holder that permits the rod to be positioned extending in any desired direction, but prohibits the rod from spinning and swaying.

These and other objects are achieved according to the present invention by providing a fishing rod holder having: a standard; and an insert mountable on a fishing rod for selectively engaging the standard.

A preferred embodiment of an insert according to the present invention is in the shape of one longitudinal half of a hyperboloid of one sheet. This shape has parallel bases of different areas. A socket is provided on the standard, and is arranged for matingly receiving the insert, a base of smallest area first.

The insert is further provided with a threaded hole, and the holder includes a bolt which threadingly engages with the threaded hole for securing the insert to a handle of a fishing rod. The bolt is arranged passing through an opening in the fishing rod handle, with the head of the bolt abutting the handle. This opening in the fishing rod handle is preferably specially fabricated, and is advantageously arranged beneath that portion of the handle where the reel is to be mounted.

An advantageous feature of the present invention is the provision of a plurality of longitudinal indentations on that base of the insert which abuts the handle. These indentations function to lock the insert against the handle.

The standard is preferably a longitudinal member with spaced ends, the socket forming one end and a planar portion forming the other end. This planar portion is inserted into ground, and the like, for preventing the standard from turning about the longitudinal extent of the member, and permits easy insertion of the standard into the ground.

Another advantageous feature of the present invention is the provision of a plurality of splines arranged extending longitudinally over substantially a middle longitudinal third portion of the insert. A plurality of grooves arranged for receiving the splines are provided in the socket. The interaction between the splines and grooves prevents a rod being supported by the standard and insert from swaying, and holds the rod in a selected position.

These together with other objects and advantages which will become subsequently apparent reside in the details of construction and operation as more fully hereinafter described and claimed, reference being had to the accompanying drawings forming a part hereof, wherein like numerals refer to like parts throughout.

DESCRIPTION OF THE PREFERRED EMBODIMENTS

Figure 1:
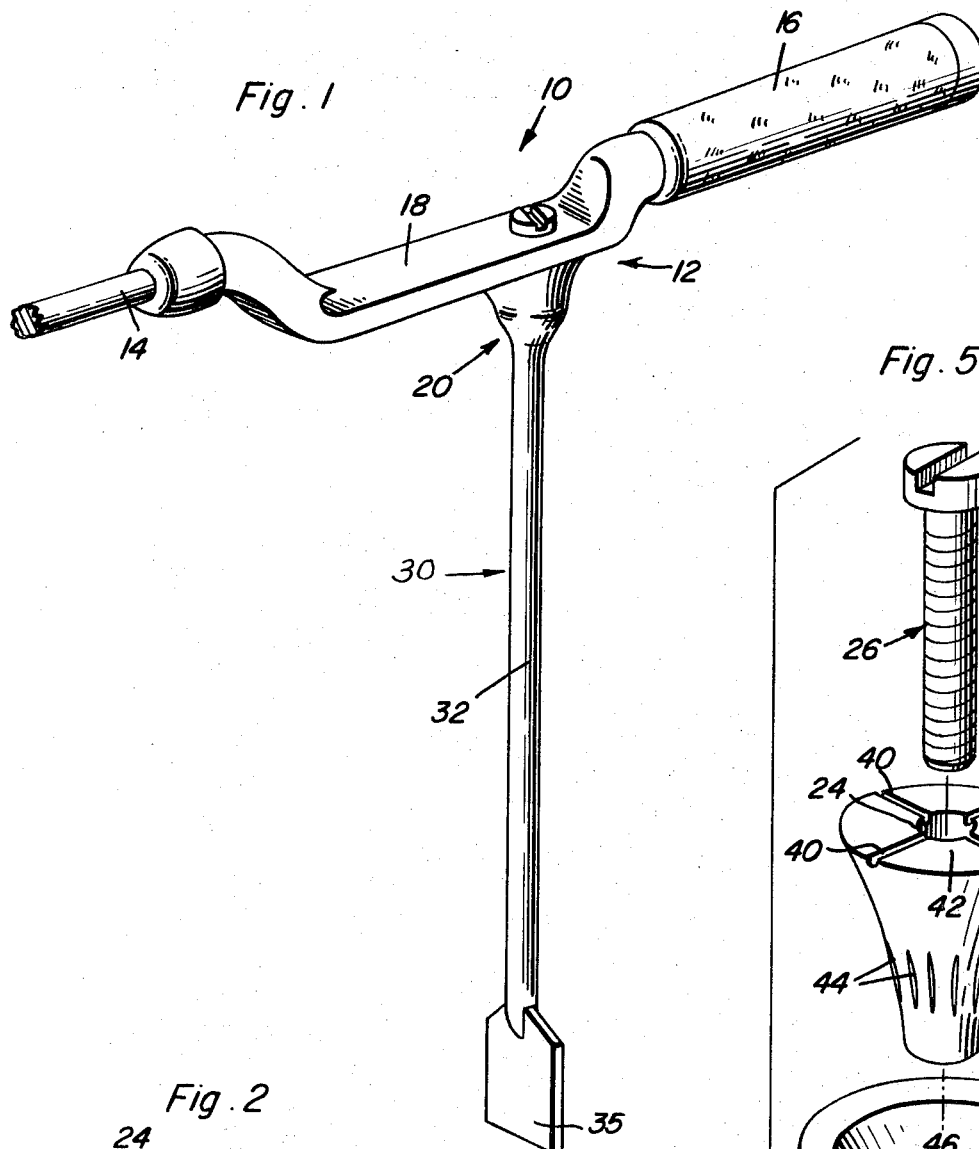
FIG. 1 is a fragmentary, perspective view showing a fishing rod holder according to the present invention attached to a fishing rod.

FIG. 1 of the drawings shows a conventional fishing rod 10 formed by a handle 12 and a rod 14. Handle 12 is in turn formed by a handgrip 16 and a reel mounting portion 18. A fishing rod holder 20 according to the present invention is shown associated with rod 10.

Figure 2:
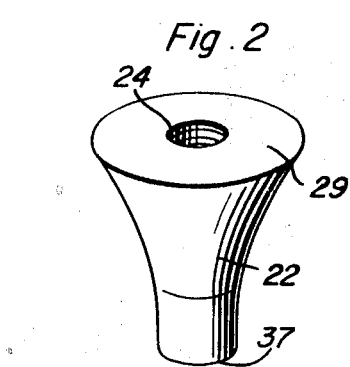
FIG. 2 is a perspective view showing an insert according to the present invention.
Figure 3:
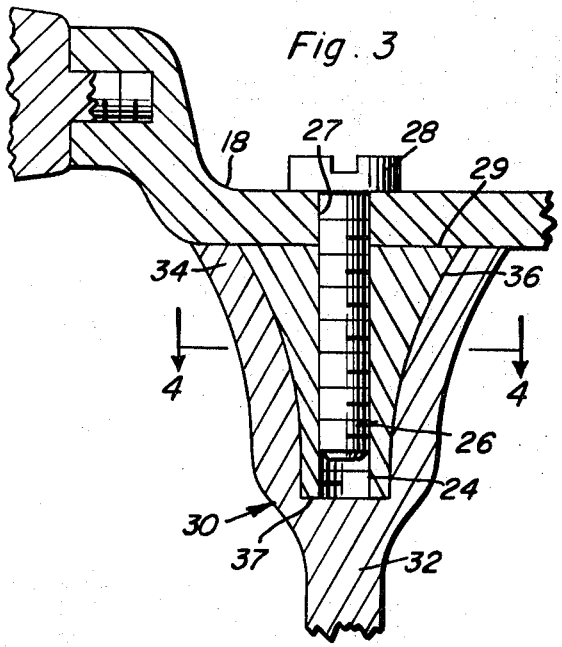
FIG. 3 is a fragmentary, vertical longitudinal sectional view showing the relative position of the elements of a fishing rod holder according to the present invention.
Figure 4:
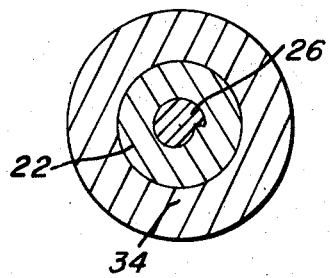
FIG. 4 is a sectional view taken generally along the lines 4—4 of FIG. 3.

Referring now to FIGS. 2 to 4 of the drawings, a first embodiment of a rod holder 20 according to the present invention includes an insert 22 which is mountable on rod 10 for selectively engaging a standard to be discussed below. Insert 22 is desirably substantially in the shape of one longitudinal half, that is a half taken by cutting a vertical section mid-way through the shape, of a hyperboloid of one sheet. Cutting the hyperboloid in this manner gives the insert 22 a pair of parallel bases of different areas. A threaded hole 24 is provided in insert 22, and a bolt 26 threadingly engages hole 24 for securing insert 22 to handle 12. An opening is provided in handle 12 in any suitable, known manner, such as drilling, to permit the shank of bolt 26 to pass through the handle and into hole 24. The head 28 of bolt 26 abuts reel mounting portion 18 of handle 12 on one side, while base 29, specifically the base of largest area of insert 22, abuts portion 18 from the other side.

By way of definition, a hyperboloid of one sheet is defined mathematically by the following equation:

$$x^2/a^2 + y^2/b^2 - z^2/c^2 = 1$$

While insert 22 has been defined as being in the shape of a hyperboloid of one sheet, it is to be understood that this is done only to conform the insert to a standard shape, and that it is within the scope of this invention to use similar, although different, shapes for the insert of rod holder 20.

A standard 30 according to the present invention is constructed as a longitudinal member or tubular shaft 32 provided with spaced ends. A socket 34 forms one end of standard 30, and a planar portion 35 is provided at the other end. This planar portion 35 prevents the standard from turning about the longitudinal extent of shaft 32 when inserted into a supporting medium (not shown) such as ground, and permits easy insertion of standard 30 into the ground, and the like. Planar portion 35, which may be thought of as a fin, is shown in FIG. 1 of the drawings. Socket 34 has an inner surface 36 formed and arranged for matingly receiving insert 22, the base 37 of smallest area being inserted into socket 34 first.

Figure 5:
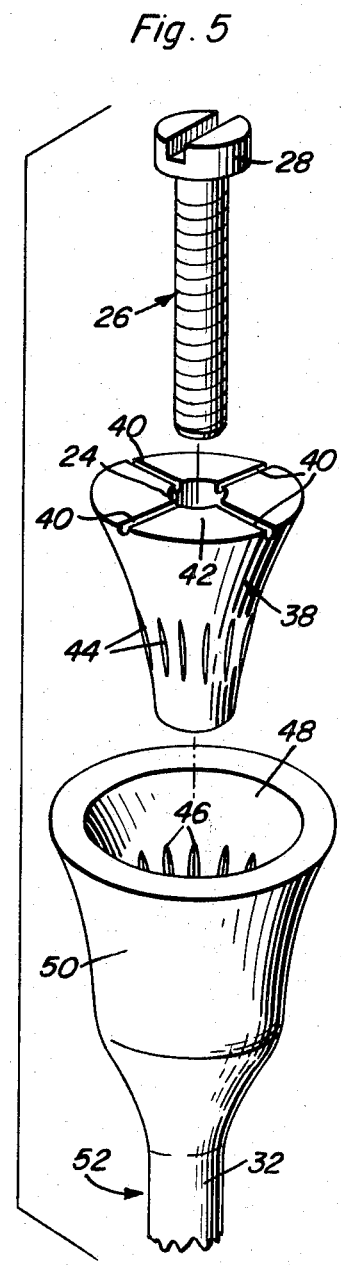
FIG. 5 is a fragmentary exploded, perspective view showing another embodiment of a fishing rod holder according to the present invention.
Figure 6:
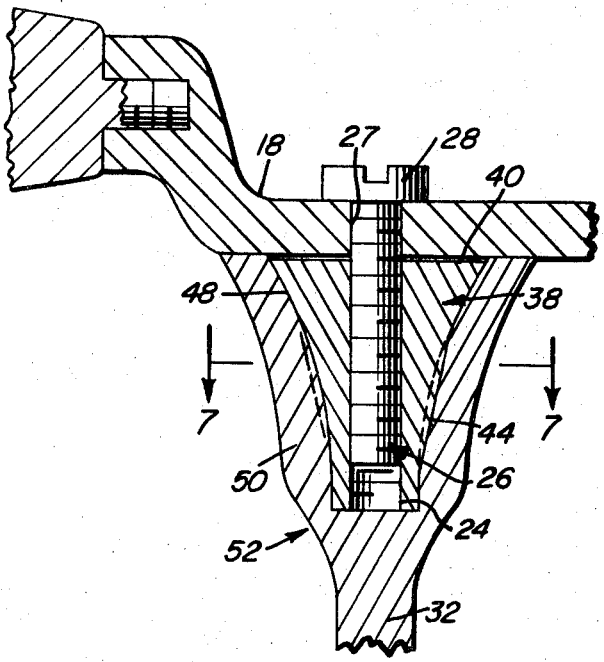
FIG. 6 is a fragmentary, vertical, longitudinal sectional view similar to FIG. 3, but showing the embodiment of FIG. 5.
Figure 7:
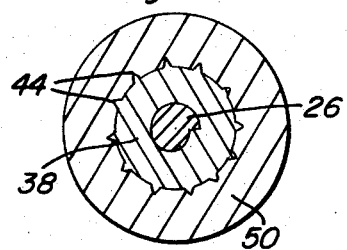
FIG. 7 is a sectional view taken generally along the line 7—7 of FIG. 6.

FIGS. 5 to 7 of the drawings show a second embodiment of a rod holder 20 according to the present invention. This rod holder has an insert 38 provided with a plurality of longitudinal indentations extending radially from a hole 34 in a base 42. The latter is the base of largest area of insert 38. These indentations 40 are arranged for abutting portion 18 of handle 12 and locking insert 38 against portion 18. In effect, indentations 40 cause base 42 to function as a lock washer, thus eliminating the need for a conventional lock washer while assuring a vibration-resistant securing of insert 38 on handle 12.

Insert 38 is further provided with a plurality of splines on its surface. These splines 44 are arranged extending longitudinally over substantially a middle longitudinal third portion of the insert. Although other placements of the splines is possible, they are preferably and advantageously arranged as illustrated in FIGS. 5 and 6 so as to cause minimum interference with the seating of insert 38 in its associated socket. A plurality of grooves 46 are provided in that associated socket, and are arranged for receiving splines 44 and preventing a rod 10 being supported by the rod holder from swaying, and holding the rod rigidly in a selected position. That is, grooves 46 provided in an inner surface 48 of a socket 50 of a standard 52 specifically constructed for use with an insert 38 cooperate with splines 44 on insert 38 to hold a rod 10 against rotation about the longitudinal axis of standard 52 regardless of what direction rod 10 has been extended. A finite number of rod positions in 360 degrees is provided by the spline and groove arrangement according to the present invention, and sway, spinning, and other undesirable movements of the rod are eliminated without sacrificing flexibility in positioning the rod.

As can be readily understood from the above description and from the drawings, a fishing rod holder according to the present invention provides a practical, dependable, and inexpensive device for supporting fish rod and other appropriate articles rigidly without sway, spin, and the like, yet permits quick and easy removal of the rod by a fisherman, and the like, as desired.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What is claimed as new is as follows:

1. A holder, comprising, in combination:
   a. a standard; and
   b. means mountable on an article to be supported for selectively engaging the standard, the engaging means including an insert in the shape of one longitudinal half of a hyperboloid of one sheet having parallel bases of different areas, and a socket provided on the standard and arranged for matingly receiving the insert, the base of smallest area being received first, the engaging means further including a threaded hole provided in the insert, and a bolt threadingly engageable with the threaded hole for securing the insert to a handle of a fishing rod, the bolt passing through an opening in the fishing rod handle, with a head of the bolt abutting the handle.

2. A structure as defined in claim 1, wherein a plurality of longitudinal indentations are provided in a base of the insert which is arranged abutting the handle for locking the insert against the handle, this base being the base of largest area.

3. A structure as defined in claim 2, wherein the standard is a longitudinal member with spaced ends, the socket forming one end, and a planar portion provided at the other end and forming a means for preventing the standard from turning about the longitudinal extent of the member when the member is arranged in a supporting medium and for permitting easy insertion of the standard into the medium.

4. A structure as defined in claim 3, wherein a plurality of splines are provided on the insert and arranged extending longitudinally over substantially a middle longitudinal third portion of the insert, and a plurality of grooves provided in the socket and arranged for receiving the splines and preventing a fishing rod being supported by the standard and insert from swaying, and holding the rod rigidly in a selected position.

5. A structure as defined in claim 1, wherein the standard is a longitudinal member with spaced ends, the socket forming one end, and a planar portion provided at the other end and forming a means for preventing the standard from turning about the longitudinal extent of the member when the member is arranged in a supporting medium and for permitting easy insertion of the standard into the medium.

6. A structure as defined in claim 5, wherein a plurality of splines are provided on the insert and arranged extending longitudinally over substantially a middle longitudinal third portion of the insert, and a plurality of grooves provided in the socket and arranged for receiving the splines and preventing a fishing rod being supported by the standard and insert from swaying, and holding the rod rigidly in a selected position.

7. A structure as defined in claim 1, wherein at least one spline is provided on one of the standard and the engaging means, and a groove arranged for receiving the spline is provided on the other of the standard and the engaging means.

8. A structure as defined in claim 7, wherein there are a plurality of splines and mating grooves provided in respective ones of the standard and engaging means.

9. In combination with a fishing rod, a fishing rod holder, comprising, in combination:
  a. a standard; and
  b. means mounted on the fishing rod for selectively engaging the standard, the engaging means including an insert in the shape of one longitudinal half of a hyperboloid of one sheet having parallel bases of different areas, and a socket provided on the standard and arranged for matingly receiving the insert, a base of smallest area being inserted first, and the engaging means further including a threaded hole provided in the insert, and a bolt threadingly engageable with the threaded hole for securing the insert to a handle of the fishing rod, an opening provided in the fishing rod handle through which the bolt is arranged to pass, and a head of the bolt abutting the handle.

10. A structure as defined in claim 9, wherein the standard is a longitudinal member with spaced ends, the socket forming one end, and a planar portion provided at the other end and forming a means for preventing the standard from turning about the longitudinal extent of the member in a supporting medium and permitting easy insertion of the standard into the medium.

11. A structure as defined in claim 9, wherein a plurality of splines are provided on the insert and arranged extending longitudinally over substantially a middle longitudinal third portion of the insert, and a plurality of grooves provided in the socket and arranged for receiving the splines and preventing the fishing rod from swaying, and holding the rod rigidly in a selected position.

12. A holder, comprising, in combination:
  a. a standard; and
  b. means mountable on a fishing rod to be supported for selectively engaging the standard, the engaging means including an insert, a socket provided on the standard and arranged for matingly receiving the insert, and means separate from a reel mounting for securing the insert to a reel mounting portion of a handle of the fishing rod independently of a reel mounted on the handle.

13. A structure as defined in claim 12, wherein the means for securing include a threaded hole provided in the insert, and a bolt threadingly engageable with the threaded hole for securing the insert to a handle of a fishing rod, the bolt passing through an opening in the fishing rod handle, with a head of the bolt abutting the handle.

* * * * *